No. 730,074. PATENTED JUNE 2, 1903.
W. A. ALLEN.
BICYCLE SEAT POST AND PUMP.
APPLICATION FILED DEC. 16, 1902.
NO MODEL.
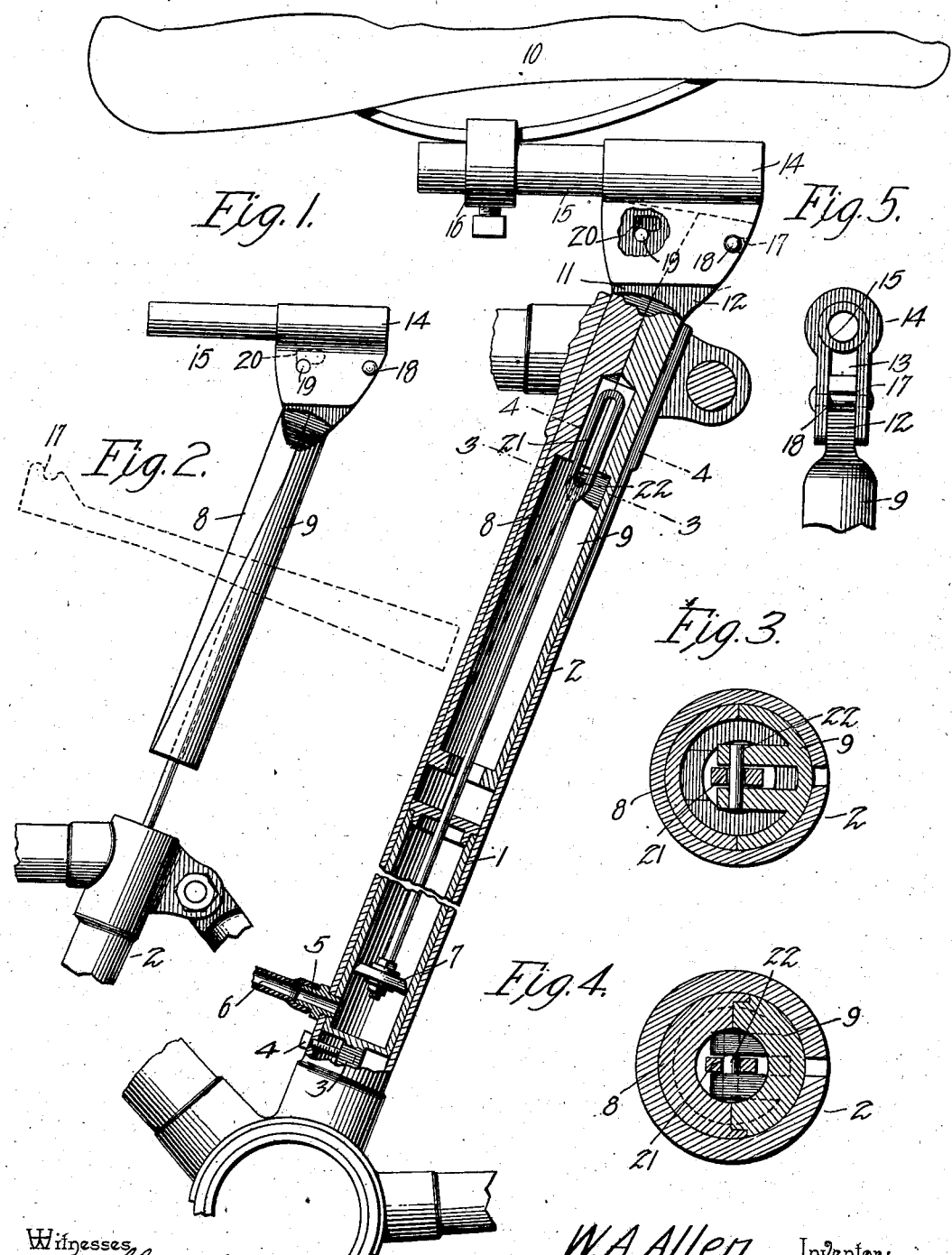
W. A. Allen, Inventor:
by C. A. Snow & Co.
Attorneys
Witnesses No. 730,074. Patented June 2, 1903.

UNITED STATES PATENT OFFICE.

WARREN A. ALLEN, OF COLLEGE PLACE, WASHINGTON.

BICYCLE SEAT-POST AND PUMP.

SPECIFICATION forming part of Letters Patent No. 730,074, dated June 2, 1903.

Application filed December 16, 1902. Serial No. 135,447. (No model.)

*To all whom it may concern:*

Be it known that I, WARREN A. ALLEN, a citizen of the United States, residing at College Place, in the county of Walla Walla and State of Washington, have invented a new and useful Bicycle Seat-Post and Pump, of which the following is a specification.

The invention relates to a bicycle seat-post and pump.

The object of the present invention is to improve the construction of bicycle-pumps and to provide a simple, inexpensive, and efficient one designed to be arranged within the frame of a bicycle in order to be concealed from view and protected from injury and adapted to be readily arranged for operation and quickly returned to its normal position.

The invention consists in the construction and novel combination and arrangement of parts hereinafter fully described, illustrated in the accompanying drawings, and pointed out in the claims hereto appended.

In the drawings, Figure 1 is a vertical sectional view of a portion of a bicycle-frame provided with a pump constructed in accordance with this invention. Fig. 2 is a detail view, the seat-post being removed from the upright tube of the bicycle-frame to form a handle for the pump. Figs. 3 and 4 are sectional views on the lines 3 3 and 4 4 of Fig. 1. Fig. 5 is a detail view of the seat-post head as viewed from the rear. Fig. 6 is a detail view of the head of the seat-post.

Like numerals of reference designate corresponding parts in all the figures of the drawings.

1 designates a pump-cylinder arranged within an upright tube 2 of a bicycle-frame and provided at its lower end with a lug 3, having a threaded perforation for the reception of a screw 4, which passes through the tube 2 and engages the lug to hold the pump-cylinder in the upright tube. The lower portion of the pump-cylinder is also connected with a nipple 5, extending through one side of the tube and the adjacent side of the cylinder and having an exteriorly-arranged portion adapted to receive a rubber tube 6 of sufficient length to be connected with either of the wheels of the bicycle. The rubber tube is removable and is applied when it is desired to use the pump; but it may be permanently connected with the nipple, if desired.

The cylinder 1 receives a plunger or piston 7 of the usual construction, and the stem or rod of the piston or plunger extends upward and is connected with a seat-post, which extends into the upper portion of the upright tube in the usual manner.

The stem of the seat-post is composed of oppositely-tapered front and rear sections 8 and 9, adapted to be moved longitudinally on each other to clamp the seat-post in the tube of the bicycle-frame and to release the same. The stem is tubular and the front section tapers downwardly and is adapted to be drawn outward by a slight tap on the saddle 10 to loosen the parts to permit the seat-post to be readily removed from the bicycle-frame. The sections 8 and 9 of the stem of the seat-post have enlarged flattened ends 11 and 12 to fit in an opening 13 of the head 14 of the seat-post, and the said head is provided with an arm or rod 15 of tubular form to receive the saddle-clamp 16. The head of the seat-post is constructed of a single piece of metal doubled to form a tubular portion to receive the rod or arm 15 and extended downward from the same to provide a pair of sides which are spaced apart to form the opening 13 for the reception of the upper ends of the sections 8 and 9 of the stem of the seat-post. One of the upper ends of the sections is provided with a notch 17, forming a hook for engaging a transverse fastening device 18 of the head, and the other section 8 is connected with the head by a pivot 19, which is arranged in an L-shaped opening 20 in the upper end of the section 8. The L-shaped opening 20, which receives the pivot 19, permits the head to be swung upward slightly and moved rearward sufficiently to disengage it from the notch of the rear section 9, thereby permitting the front section to be removed from the upright tube of the bicycle-frame sufficiently to loosen the rear section and permit the same to be detached. When the head is disconnected from the rear section, the front section of the stem may be entirely removed from the upright 2, together with the saddle. The rear section after it is removed from the tube is turned at right angles to the stem of the plunger or piston of the air-pump, as illustrated in dotted lines in Fig. 2, to form a handle for operating the pump. After the tires have been inflated the rear section of the stem is first replaced in the tube, then the front section is introduced into the latter, and the head of the seat-post is engaged with the hook-shaped portion of the upper end of the rear section. After the seat is adjusted to the proper height the stem is locked in the upright tube by forcing the front portion of the saddle downward to carry the pivot 19 into the upper portion of the L-shaped slot 20. This causes the sections of the stem to move on each other sufficiently to firmly clamp the seat-post at the desired adjustment. The saddle forms sufficient leverage to enable the front section of the stem to be readily loosened by a light tap on the bottom of the front portion of the said saddle.

In order to prevent the air-pump from interfering with the vertical adjustment of the seat, the upper end of the stem of the piston or plunger is provided with an elongated slot 21 for the reception of a pin 22, which is carried by the rear section of the stem and permits the stem to move longitudinally.

It will be seen that the bicycle-pump is exceedingly simple and inexpensive in construction, that it is adapted to be readily applied to an ordinary bicycle, and that it is concealed from view and is protected from injury in case of accident. It will also be apparent that the pump is especially adapted for bicycles employed in long rides, and that it is always in position for use and may be quickly arranged for operation. It will also be apparent that the saddle and the major portion of the seat-post are detached from the bicycle and that the rear section of the stem of the seat-post is pivotally connected with the piston of the pump and is adapted to be arranged at right angles to the same to form a handle.

What I claim is—

1. In a device of the class described, the combination with a bicycle-frame, of a pump located within the same, and a seat-post provided with a stem composed of separable tapered or wedge-shaped sections forming a clamp, one of the sections being connected with the piston of the pump and forming a handle for the same, substantially as described.

2. In a device of the class described, the combination with a bicycle-frame, of a pump located within the same, and a seat-post provided with an expansible stem fitting within the frame of the bicycle and forming a clamp and connected with the piston of the pump, substantially as described.

3. In a device of the class described, the combination with a bicycle-frame, of a pump arranged within the same, and a seat-post comprising a stem composed of two sections, one of the sections being connected with the pump, and a head movably mounted on one of the sections and detachably interlocked with the other, substantially as described.

4. In a device of the class described, the combination with a bicycle-frame, of a pump arranged within the same, and a seat-post comprising a stem composed of two sections, one of the sections being slidably and pivotally connected with the piston of the pump, and a head mounted on the other section and detachably interlocked with the section which is connected with the pump, substantially as described.

5. In a device of the class described, the combination with a bicycle-frame, of a pump arranged within the same, and a seat-post composed of a stem having two tapered or wedge-shaped sections forming a clamp, one of the sections being connected with the pump, and a head mounted on one of the sections of the stem and detachably interlocked with the other section, substantially as described.

6. In a device of the class described, the combination with a bicycle-frame, of a pump arranged within the same, a stem composed of two tapered sections, one of the sections having a hook-shaped portion and connected with the pump, and the other section being provided with an L-shaped opening, and a head detachably interlocked with the hook-shaped portion and provided with a pivot for engaging in said opening, substantially as described.

7. In a device of the class described, the combination with a bicycle-frame, of a pump arranged within the same, a piston for the pump, a slotted piston-rod secured to said piston, a stem composed of two sections, and a pin carried by one of the sections and fitting within said slot, substantially as described.

In testimony that I claim the foregoing as my own I have hereto affixed my signature in the presence of two witnesses.

WARREN A. ALLEN.

Witnesses:
D. R. NICHOLS,
GEO. E. ALLEN.